United States Patent
Supanekar

(10) Patent No.: US 12,445,926 B2
(45) Date of Patent: Oct. 14, 2025

(54) SON ASSISTED OPTIMIZED RAT SELECTION FOR UE IN A VIRTUALIZED RAN ENVIRONMENT

(71) Applicant: Parallel Wireless, Inc., Nashua, NH (US)

(72) Inventor: Ketan Supanekar, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 279 days.

(21) Appl. No.: 17/495,284

(22) Filed: Oct. 6, 2021

(65) Prior Publication Data

US 2022/0110040 A1  Apr. 7, 2022

Related U.S. Application Data

(60) Provisional application No. 63/088,012, filed on Oct. 6, 2020.

(51) Int. Cl.
*H04W 36/22* (2009.01)
*H04W 36/14* (2009.01)
*H04W 60/04* (2009.01)

(52) U.S. Cl.
CPC ........... *H04W 36/22* (2013.01); *H04W 60/04* (2013.01); *H04W 36/1443* (2023.05)

(58) Field of Classification Search
CPC ........... H04W 36/22; H04W 36/00835; H04W 36/00837; H04W 36/32; H04W 60/04; H04W 24/02; H04W 36/14
See application file for complete search history.

(56) References Cited

U.S. PATENT DOCUMENTS

| 8,682,327 | B2 | 3/2014 | Tenny et al. | |
|---|---|---|---|---|
| 9,253,704 | B1 | 2/2016 | Sarkar et al. | |
| 9,370,039 | B2 | 6/2016 | Uchiyama et al. | |
| 9,521,008 | B2 | 12/2016 | Kim et al. | |
| 10,869,248 | B1* | 12/2020 | Oroskar | H04W 36/14 |
| 2010/0285803 | A1* | 11/2010 | Persson | H04W 28/22 |
| | | | | 455/436 |
| 2012/0135739 | A1 | 5/2012 | Paterson | |
| 2012/0236707 | A1 | 9/2012 | Larsson et al. | |

(Continued)

OTHER PUBLICATIONS

The 3G4G Blog: LTE to 3G Handover Procedure and Signaling, "LTE to 3G Handover Procedure and Signalling", Mar. 3, 2011.

(Continued)

*Primary Examiner* — Ivan O Latorre
(74) *Attorney, Agent, or Firm* — Michael Y. Saji

(57) ABSTRACT

A method, system, and computer readable medium are disclosed for a Self Organizing Network (SON) assisted optimized Radio Access Technology (RAT) selection for a User Equipment (UE) in a virtualized Radio Access Network (RAN) environment. In one embodiment a method includes establishing, by a UE, a Signaling Radio Bearer (SRB) and a Data Radio Bearer (DRB) with a virtualized node (VENB); determining whether the VENB has reached a data saturation limit; when the VENB has reached the data saturation limit, then determining if a virtualized function (VRNC) has reached a data saturation limit; and when the VRNC is determined not to have reached the data saturation limit, then initiating an Long Term Evolution (LTE) to 3G handover procedure for the UE and specifying a target 3G cell.

20 Claims, 5 Drawing Sheets

(56) References Cited

U.S. PATENT DOCUMENTS

| | | | |
|---|---|---|---|
| 2014/0198640 A1 | 7/2014 | Suzuki et al. | |
| 2016/0277992 A1* | 9/2016 | Cao | H04W 28/0861 |
| 2017/0078937 A1* | 3/2017 | El-Najjar | H04W 36/0011 |
| 2017/0315813 A1 | 11/2017 | Fujinami | |
| 2020/0351732 A1* | 11/2020 | Mwanje | H04W 24/10 |
| 2021/0051745 A1* | 2/2021 | Supanekar | H04W 36/14 |

OTHER PUBLICATIONS

LTE; Evolved Universal Terrestrial Radio Access (E-UTRA); Radio Resource Control (RRC); Protocol specification (3GPP TS 36.331 version 13.0.0 Release 13), ETSI TS 136 331 V13.0.0 (Jan. 2016).

* cited by examiner

SON ASSISTED OPTIMIZED RAT SELECTION FOR UE IN A VIRTUALIZED RAN ENVIRONMENT

CROSS-REFERENCE TO RELATED APPLICATIONS

This application claims priority under 35 U.S.C. § 119(e) to U.S. Provisional Pat. App. No. 63/088,012, filed Oct. 6, 2020, titled "SON Assisted Optimized RAT Selection for UE in a Virtualized RAN Environment" which is hereby incorporated by reference in its entirety for all purposes. The present application also hereby incorporates by reference each of U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

In a geographic area receiving both 4G & 3G coverage from a Parallel Wireless Multi-RAT node (CWS) the default settings might dictate modern smartphone-based UE to connect to 4G network which will provide better UL/DL speeds theoretically as compared to 3G network.

However, the assumption that 4G network is the best network to connect to might not be accurate in a virtualized RAN environment as the 4G virtual node might be approaching data throughput saturation limits and a 4G bearer may not provide the best UL/DL throughput in that case.

At the same time, the VRNC virtual node might have enough data throughput capacity remaining and is able to provide better throughput to user using 3G bearer.

SUMMARY

In a virtualized multi rat radio network there is cloud computing component which virtualizes the radio network controllers under it by aggregating and proxying their core network signaling. It also proxies data streams coming from these multi rat nodes.

For 3G networks cloud runs a virtualized function VRNC while for 4G networks the virtualized node is called VENB. The virtualized nodes have capacity limits in terms of number of UE's which can be served by them while maintaining acceptable levels of QOS. QOS is often measured as UL/DL data rate for PS domain.

These virtualized nodes run as part of cloud-based RAN virtualization platform which spawns and manages these virtual nodes. The RAN virtualization platform (e.g. PW HNG) has visibility into KPI's of these devices.

In one embodiment a method of providing Self Organizing Network (SON) assisted optimized Radio Access Technology (RAT) selection for a User Equipment (UE) in a virtualized Radio Access Network (RAN) environment is described. In one embodiment a method includes establishing, by a UE, a Signaling Radio Bearer (SRB) and a Data Radio Bearer (DRB) with a virtualized node (VENB); determining whether the VENB has reached a data saturation limit; when the VENB has reached the data saturation limit, then determining if a virtualized function (VRNC) has reached a data saturation limit; and when the VRNC is determined not to have reached the data saturation limit, then initiating an Long Term Evolution (LTE) to 3G handover procedure for the UE and specifying a target 3G cell.

In another embodiment, a system for providing Self Organizing Network (SON) assisted optimized Radio Access Technology (RAT) selection for a User Equipment (UE) in a virtualized Radio Access Network (RAN) environment, includes a UE; a HetNet Gateway (HNG) including a virtualized node (VENB) in communication with the UE; wherein the UE establishes a Signaling Radio Bearer (SRB) and a Data Radio Bearer (DRB) with a virtualized node (VENB); wherein the HNG determines whether the VENB has reached a data saturation limit; when the VENB has reached the data saturation limit, then the HNG determines if a virtualized function (VRNC) has reached a data saturation limit; and when the VRNC is determined not to have reached the data saturation limit, then the HNG initiates an Long Term Evolution (LTE) to 3G handover procedure for the UE and specifies a target 3G cell.

In another embodiment, a non-transitory computer-readable medium containing instructions for a Self Organizing Network (SON) assisted optimized Radio Access Technology (RAT) selection for a User Equipment (UE) in a virtualized Radio Access Network (RAN) environment, when executed, cause a system to perform steps including establishing, by a UE, a Signaling Radio Bearer (SRB) and a Data Radio Bearer (DRB) with a virtualized node (VENB); determining whether the VENB has reached a data saturation limit; when the VENB has reached the data saturation limit, then determining if a virtualized function (VRNC) has reached a data saturation limit; and when the VRNC is determined not to have reached the data saturation limit, then initiating an Long Term Evolution (LTE) to 3G handover procedure for the UE and specifying a target 3G cell.

DETAILED DESCRIPTION

Consider a geographic area receiving both 4G & 3G coverage from a Parallel wireless Multi-RAT node (CWS). In this situation the default settings might dictate modern smartphone-based UE to connect to 4G network which will provide better UL/DL speeds theoretically as compared to 3G network. While the present description references 3G and 4G RATS, it should be appreciated that the same concepts apply to any RAT.

However, the assumption that 4G network is the best network to connect to might not be accurate in a virtualized RAN environment as the 4G virtual node might be approaching data throughput saturation limits and a 4G bearer may not provide the best UL/DL throughput in that case.

At the same time, the VRNC virtual node might have enough data throughput capacity remaining and is able to provide better throughput to user using 3G bearer.

Figure 1:
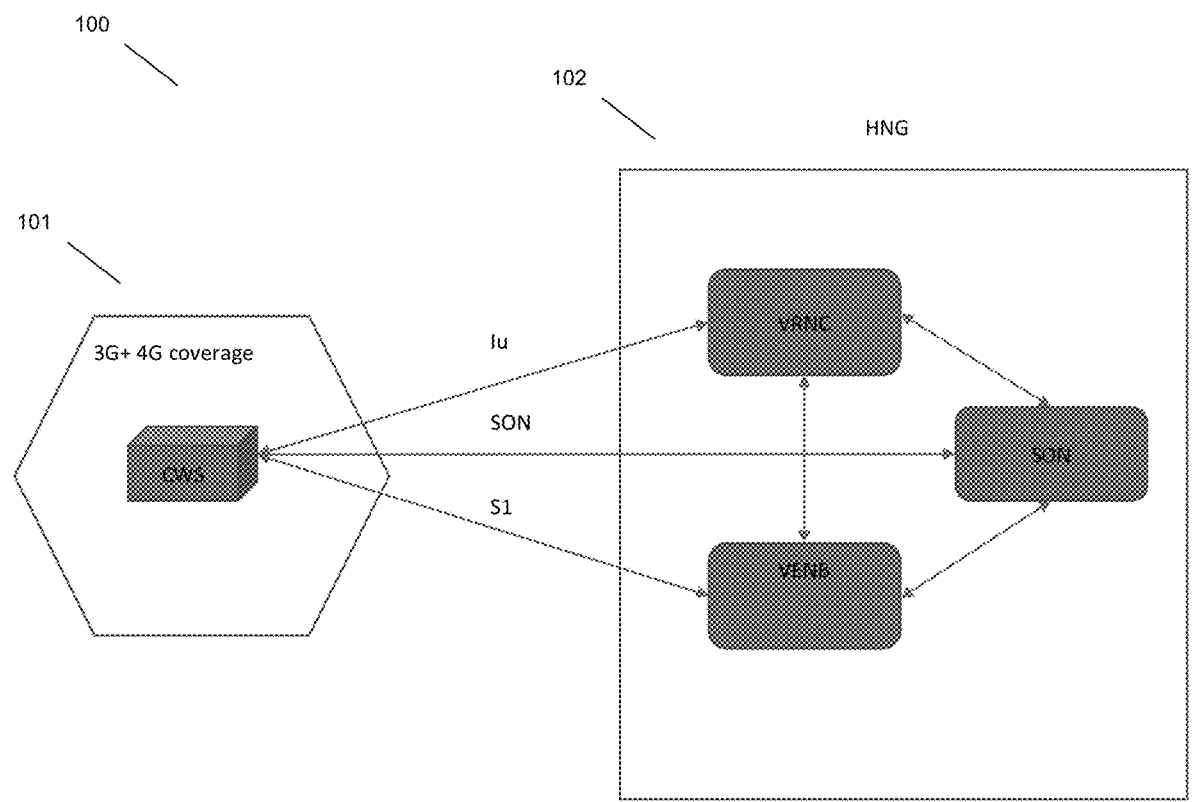
FIG. 1 is a block diagram showing components for providing SON Assisted Optimized RAT Selection for UE in a Virtualized RAN Environment, in accordance with some embodiments.

FIG. 1 is a diagram showing an environment 100 for providing SON assisted optimized RAT for a UE in a virtualized RAN environment. The environment 100 includes a CWS 102 in communication with an HNG 101. The HNG includes a VRNC 103, a SON 104 and a VENB 105, all in communication with each other.

The SON module running on HNG is used to detect data throughput saturation inside 4G Virtual Node (VENB) and initiate a 'LTE to 3G Handover Procedure' from VENB for the attached UE to redirect it to 3G Virtual Node (VRNC) which can provide better overall UL/DL throughput.

Detection by SON

Inside the HNG, SON is an Open Application Module (OAM) module responsible for node configuration, Key Performance Indicator (KPI) monitoring and stats collection. SON has global view of the coverage area of CWS cells and their KPI's as well as KPI's of virtual nodes.

SON can detect when UE connected to a 4G CWS cell simultaneously sees 3G CWS cell in certain geographic area. This information can be based on either GEO neighbors built by SON or UE reported Inter-RAT neighbors sent to SON by the CWS cells.

When UE registers itself with VENB it establishes Signaling Radio Bearer 2 (SRB2) and at least one Data Radio Bearer (DRB) is setup. SON comes to know of this event using triggers from VENB module. On each of these triggers SON calculates if VENB has necessary bandwidth available to satisfy 4G bearer capacity requirements. If not, SON instructs VENB module to perform handover to UTRAN by sending required signaling to MME.

Role of VENB/VRNC

On receiving trigger from SON module to initiate handover to UMTS Terrestrial Radio Access Network (UTRAN), VENB sends to MME 'Handover required' message having identification of the target SON controlled 3G cell.

The core network entities in the 3G and 4G systems perform further signaling to prepare resources at the target 3G cell for the 3G bearer. This signaling goes through the VRNC as it is virtualizing the target 3G cell.

Once resources are setup at target cell MME sends Handover command to VENB and subsequently VENB forwards same to UE to switch radio systems.

Role of UE

UE should switch to UTRAN cell using target cell information that is provided in 'LTE to 3G Handover Procedure'. At UE when radio link configuration is complete a notification is sent to MME to complete the handover signaling.

Figure 2:
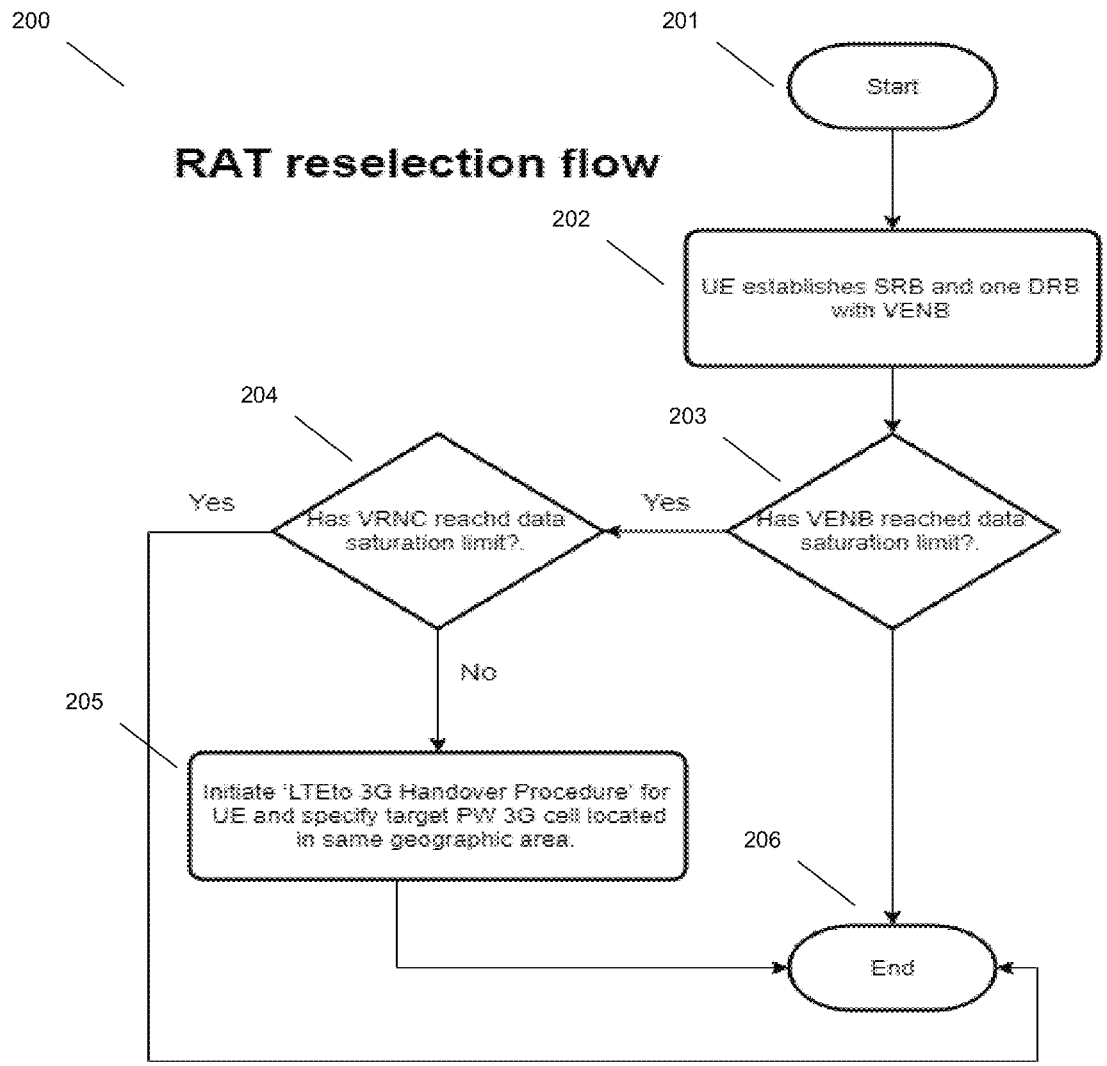
FIG. 2 is a flow diagram showing RAT reselection, in accordance with some embodiments.

A flow chart of a particular embodiment of the presently disclosed method is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

FIG. 2 is a flow diagram 200 showing RAT reselection, in accordance with some embodiments. The method 200 starts with processing block 201. This block relates to initializing parameters, counters, variables and the like. Processing block 202 recites the UE establishes SRB and one DRB with VENB.

Decision block 203 determines whether the VENB has reached a data saturation limit. When the determination is that the VENB has reached a data saturation limit, then processing continues with decision block 204. When the determination is that the VENB has not reached a data saturation limit then the process is terminated, as shown by processing block 206.

Decision block 204 determines whether the VRNC has reached a data saturation limit. When the determination is that the VRNC has reached a data saturation limit, then the process is terminated, as shown by processing block 206. When the determination is that the VRNC has not reached a data saturation limit then processing block 205 is executed wherein an "LTE to 3G Handover Procedure" for UE and specify target PW 3G cell located in a same geographic area is performed. The process is then terminated, as shown by processing block 206.

Figure 3:
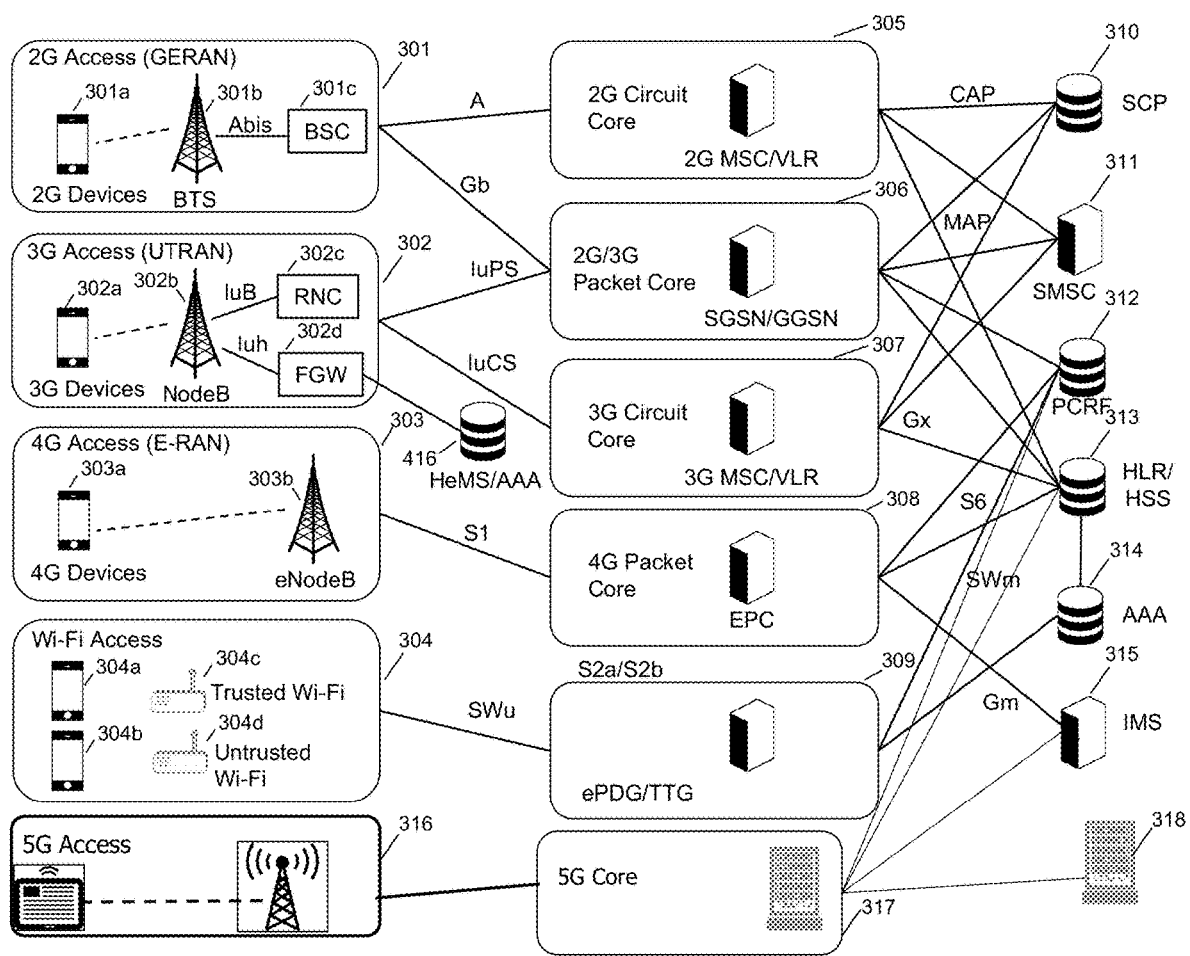
FIG. 3 is a network architecture diagram, in accordance with some embodiments.

FIG. 3 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non- "G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 4:
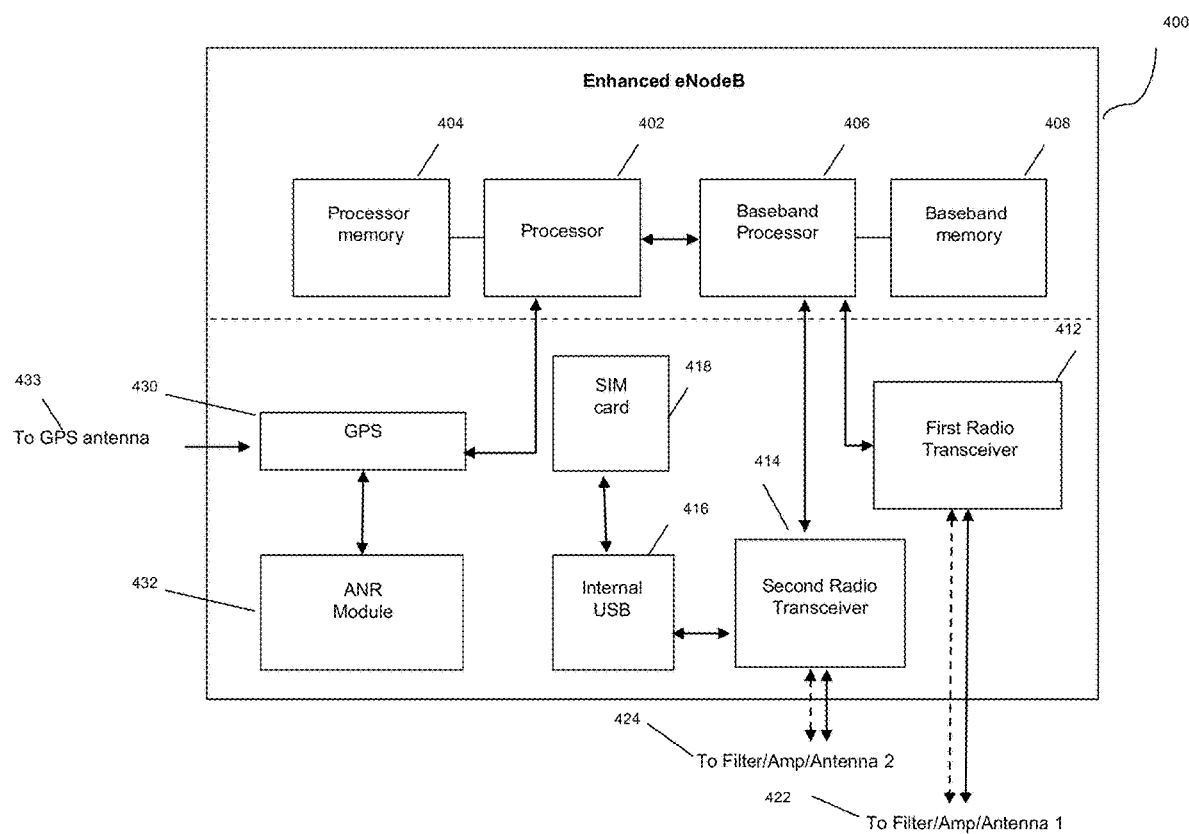
FIG. 4 is an enhanced eNodeB for performing the methods described herein, in accordance with some embodiments.

FIG. 4 shows an enhanced eNodeB for performing the methods described herein, in accordance with some embodiments. eNodeB 500 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
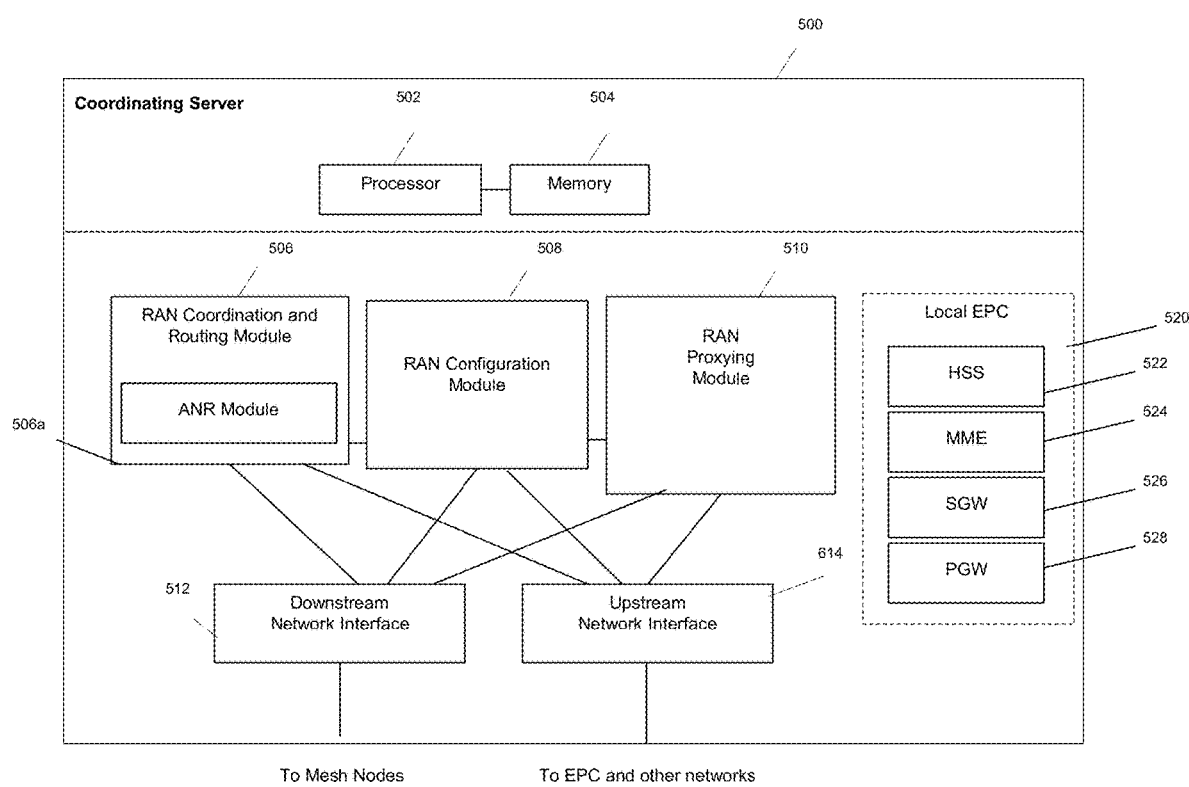
FIG. 5 is a coordinating server for providing services and performing methods as described herein, in accordance with some embodiments.

FIG. 5 shows a coordinating server for providing services and performing methods as described herein, in accordance with some embodiments. Coordinating server 600 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of providing Self Organizing Network (SON) assisted optimized Radio Access Technology (RAT) selection for a User Equipment (UE) in a virtualized Radio Access Network (RAN) environment, comprising:
   establishing, by a UE, a Signaling Radio Bearer (SRB) and a Data Radio Bearer (DRB) with a virtualized node (VENB);
   determining, within a SON module located at a RAN virtualization environment, whether the VENB has reached a data saturation limit for uplink/downlink throughput with at least one UE, wherein the SON module has global visibility of a plurality of virtual cells and their KPIs;
   when the VENB has reached the data saturation limit, then determining, at the SON module, if a virtualized 3G function (VRNC) has reached the data saturation limit; and
   when the VRNC is determined not to have reached the data saturation limit, then initiating a Long Term Evolution (LTE) to 3G handover procedure for the UE and specifying a target 3G cell.

2. The method of claim 1 further comprising detecting, by the SON, when a UE connected to a 4G CWS cell sees a 3G CWS cell in a certain geographic area.

3. The method of claim 2 wherein the detecting is based on neighbors built by the SON.

4. The method of claim 2 wherein the detecting is based on UE reported Inter-RAT neighbors sent to the SON by the CWS cells.

5. The method of claim 1 further comprising establishing, by the UE, a Signaling Radio Bearer 2 (SRB2) when the UE registers itself with the VENB and at least one Data Radio Bearer (DRB) is setup.

6. The method of claim 1 further comprising the VENB receiving a trigger from the SON to initiate handover to a UMTS Terrestrial Radio Access Network (UTRAN).

7. The method of claim 6 further comprising sending, by the VENB to the MME, a handover required message having identification of the target SON controlled by a 3G cell.

8. The method of claim 7 further comprising sending, by the UE to the MME, a notification to complete the handover signaling when radio link configuration is complete.

9. A system of providing Self Organizing Network (SON) assisted optimized Radio Access Technology (RAT) selection for a User Equipment (UE) in a virtualized Radio Access Network (RAN) environment, comprising:
   a UE;

a HetNet Gateway (HNG) including a virtualized node (VENB) in communication with the UE;

wherein the UE establishes a Signaling Radio Bearer (SRB) and a Data Radio Bearer (DRB) with a virtualized node (VENB);

wherein the HNG determines whether the VENB has reached a data saturation limit for uplink/downlink throughput with at least one UE, wherein the HNG has global visibility of a plurality of virtual cells and their KPIs;

when the VENB has reached the data saturation limit, then the HNG determines if a virtualized function (VRNC) has reached a data saturation limit; and when the VRNC is determined not to have reached the data saturation limit, then the HNG initiates a Long Term Evolution (LTE) to 3G handover procedure for the UE and specifies a target 3G cell.

10. The system of claim 9 further comprising detecting, by the SON, when a UE connected to a 4G CWS cell sees a 3G CWS cell in a certain geographic area.

11. The system of claim 10 wherein the detecting is based on neighbors built by the SON.

12. The system of claim 10 wherein the detecting is based on UE reported Inter-RAT neighbors sent to the SON by the CWS cells.

13. The system of claim 9 further comprising establishing, by the UE, a Signaling Radio Bearer 2 (SRB2) when the UE registers itself with the VENB and at least one Data Radio Bearer (DRB) is setup.

14. The system of claim 9 further comprising the VENB receiving a trigger from the SON to initiate handover to a UMTS Terrestrial Radio Access Network (UTRAN).

15. The system of claim 14 further comprising sending, by the VENB to the MME, a handover required message having identification of the target SON controlled by a 3G cell.

16. The system of claim 15 further comprising sending, by the UE to the MME, a notification to complete the handover signaling when radio link configuration is complete.

17. A non-transitory computer-readable medium containing instructions for a Self Organizing Network (SON) assisted optimized Radio Access Technology (RAT) selection for a User Equipment (UE) in a virtualized Radio Access Network (RAN) environment, when executed, cause a system to perform steps comprising:

establishing, by a UE, a Signaling Radio Bearer (SRB) and a Data Radio Bearer (DRB) with a virtualized node (VENB);

determining, within a SON module located at a RAN virtualization environment, whether the VENB has reached a data saturation limit for uplink/downlink throughput with at least one UE, wherein the SON module has global visibility of a plurality of virtual cells and their KPIs;

when the VENB has reached the data saturation limit, then determining if a virtualized function (VRNC) has reached a data saturation limit; and when the VRNC is determined not to have reached the data saturation limit, then initiating a Long Term Evolution (LTE) to 3G handover procedure for the UE and specifying a target 3G cell located.

18. The computer-readable medium of claim 17 further comprising instructions for detecting, by the SON, when a UE connected to a 4G CWS cell sees a 3G CWS cell in a certain geographic area.

19. The computer-readable medium of claim 17 further comprising instructions for establishing, by the UE, a Signaling Radio Bearer 2 (SRB2) when the UE registers itself with the VENB and at least one Data Radio Bearer (DRB) is setup.

20. The computer-readable medium of claim 17 further comprising instructions for sending, by the VNB to the MME, a handover required message having identification of the target SON controlled by a 3G cell.

* * * * *